(12) United States Patent
Okuda et al.

(10) Patent No.: US 9,977,973 B2
(45) Date of Patent: May 22, 2018

(54) VEHICLE DRIVING ASSIST APPARATUS

(71) Applicant: TOYOTA JIDOSHA KABUSHIKI KAISHA, Toyota-shi, Aichi (JP)

(72) Inventors: Masato Okuda, Okazaki (JP); Yuka Sobue, Nagoya (JP); Hironobu Ishijima, Toyota (JP); Issei Matsunaga, Nissin (JP); Daisuke Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/460,778

(22) Filed: Mar. 16, 2017

(65) Prior Publication Data
US 2017/0357861 A1   Dec. 14, 2017

(30) Foreign Application Priority Data

Jun. 10, 2016   (JP) ................. 2016-116280

(51) Int. Cl.
| | |
|---|---|
| *G06K 9/00* | (2006.01) |
| *G06T 7/73* | (2017.01) |
| *B60W 30/09* | (2012.01) |
| *G08G 1/16* | (2006.01) |
| *H04N 7/18* | (2006.01) |

(52) U.S. Cl.
CPC ......... *G06K 9/00805* (2013.01); *B60W 30/09* (2013.01); *G06K 9/00798* (2013.01); *G06T 7/74* (2017.01); *G08G 1/16* (2013.01); *H04N 7/183* (2013.01); *B60R 2300/00* (2013.01); *B60W 2420/42* (2013.01); *B60W 2550/10* (2013.01); *B60W 2550/142* (2013.01); *B60W 2710/18* (2013.01); *G06T 2207/30244* (2013.01); *G06T 2207/30256* (2013.01); *G06T 2207/30261* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 2014/0222280 | A1* | 8/2014 | Salomonsson | G08G 1/167 701/28 |
| 2014/0379233 | A1* | 12/2014 | Chundrlik, Jr. | B60T 8/171 701/70 |
| 2016/0297365 | A1* | 10/2016 | Nix | B60R 1/002 |
| 2017/0098131 | A1* | 4/2017 | Shashua | G06K 9/00805 |

FOREIGN PATENT DOCUMENTS

| | | | |
|---|---|---|---|
| JP | 2007-240422 | A | 9/2007 |
| JP | 2007240422 | A * | 9/2007 |
| JP | 2013-092820 | A | 5/2013 |

* cited by examiner

*Primary Examiner* — Delomia L Gilliard
(74) *Attorney, Agent, or Firm* — Oliff PLC

(57) ABSTRACT

A vehicle driving assist apparatus executes a vehicle collision prevention control when a target object distance from a vehicle to a target object is equal to or smaller than a predetermined distance. The apparatus acquires the target object distance on the basis of a position of the target object in a camera image taken by a camera and a height of the camera in a situation that a movable load of the vehicle is a maximum load capacity.

9 Claims, 10 Drawing Sheets

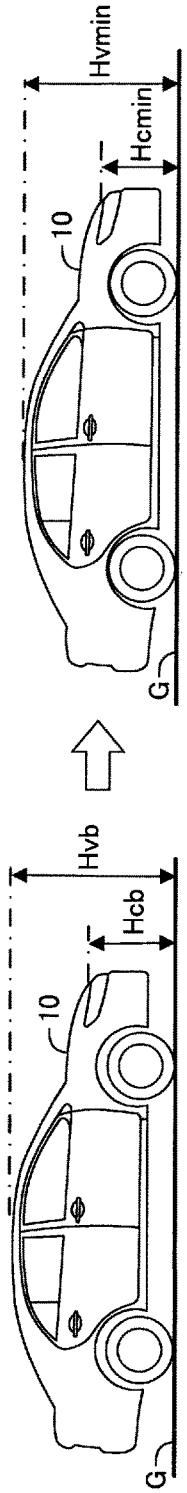
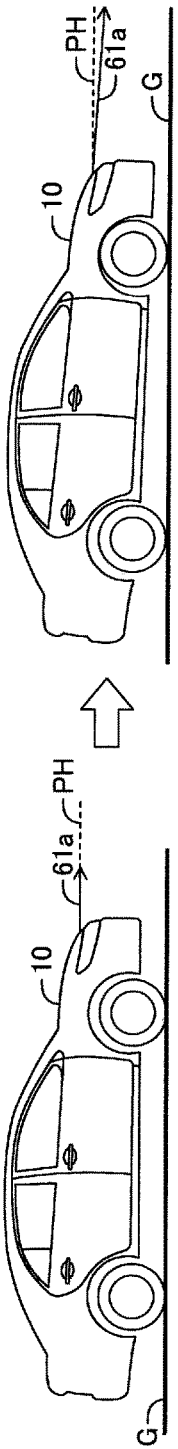
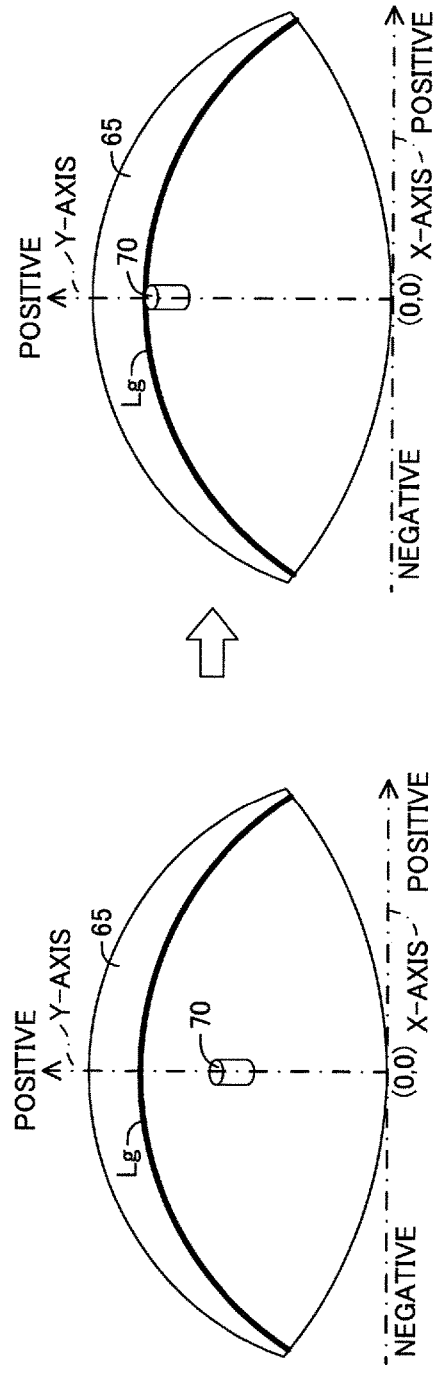
FIG.5A
FIG.5B
FIG.5C

VEHICLE DRIVING ASSIST APPARATUS

BACKGROUND OF THE INVENTION

Field of the Invention

The invention relates to a vehicle driving assist apparatus.

Description of the Related Art

There is known an apparatus for performing an automatic braking for automatically braking a vehicle to prevent a collision of the vehicle against an obstacle which exists in front of the vehicle in a traveling direction of the vehicle. This apparatus (hereinafter, will be referred to as "the first conventional apparatus") comprises a camera for taking an image of a landscape in front of the vehicle. The first conventional apparatus detects an obstacle position corresponding to a position of the obstacle in the image of the landscape taken by the camera and acquires an obstacle distance corresponding to a distance from the vehicle to the obstacle on the basis of the obstacle position. The first conventional apparatus performs the automatic braking when the obstacle is within a predicted traveling range of the vehicle and the obstacle distance becomes equal to or smaller than a predetermined distance.

When a front part of a body of the vehicle lowers with respect to a rear part of the body of the vehicle, a camera optical axis corresponding to an optical axis of the camera directs downward to the ground with respect to the camera optical axis before the front part lowers with respect to the rear part. In this case, the obstacle position in the camera image is located at an upper side of the obstacle position before the camera optical axis directs downward. In this case, the obstacle distance acquired by the first conventional apparatus is larger than an actual distance from the vehicle to the obstacle. Therefore, a start timing of the automatic braking delays with respect to the start timing of the automatic braking in a situation that the obstacle distance is equal to the actual distance.

Accordingly, there is known an apparatus which is configured to detect a change of the camera optical axis with respect to a horizontal plane on the basis of a temporal change pattern of the obstacle position in a vertical direction in the camera image and correct the acquired obstacle distance on the basis of the change of the camera optical axis, thereby to acquire the obstacle distance equal to the actual distance (for example, refer to JP 2013-092820 A).

When a movable load of the vehicle increases, the body of the vehicle lowers toward the ground.

In this case, a camera height corresponding to a height of the camera from the ground decreases. In this case, the obstacle distance acquired by the first conventional apparatus is larger than the actual distance.

There is known a fact that the temporal change pattern of a position of a vanishing point in the camera image varies depending on the camera height when the vehicle is traveling. Accordingly, there is known an apparatus for acquiring the camera height on the basis of the temporal change pattern of the position of the vanishing point in the camera image. This apparatus (hereinafter, will be referred to as "the second conventional apparatus") is configured to correct the acquired obstacle distance on the basis of the camera height, thereby to acquire the obstacle distance equal to the actual distance.

The second conventional apparatus can acquire the camera height only when the vehicle is traveling. Therefore, the second conventional apparatus cannot acquire the camera height when the vehicle stops. Thus, the second conventional apparatus cannot acquire the obstacle distance equal to the actual distance when the vehicle stops. When the obstacle distance larger than the actual distance is acquired, the start timing of the automatic braking delays with respect to the suitable timing.

SUMMARY OF THE INVENTION

The invention has been made for solving the aforementioned problem. An object of the invention is to provide a vehicle driving assist apparatus which can increase a possibility that the obstacle distance equal to the actual distance is acquired when the vehicle is traveling and decrease a possibility that the obstacle distance larger than the actual distance is acquired when the vehicle stops. Hereinafter, the vehicle driving assist apparatus according to the invention will be referred to as "the invention apparatus".

The invention apparatus is applied to a vehicle (10) which comprises a camera device (60) including a camera (61) for taking an image of a landscape in front of the vehicle (10) in a traveling direction of the vehicle (10). The invention apparatus comprises at least one electric control unit (20, 30, 40, 50).

The at least one electric control unit (20, 30, 40, 50) is configured to acquire a target object distance (Dest) which corresponds to a distance from the vehicle (10) to a predetermined target object (70) (refer to a process of a step 920 in FIG. 9) when the predetermined target object (70) is included in a camera image (65) which corresponds to an image of the landscape taken by the camera (61) (refer to a determination "Yes" at a step 905 in FIG. 9).

The at least one electric control unit (20, 30, 40, 50) is further configured to execute a collision prevention control for preventing the vehicle (10) from colliding against the predetermined target object (70) (refer to processes of steps 1015 and 1030 in FIG. 10) when the predetermined target object (70) is within a predicted traveling range of the vehicle (10) and the target object distance (Dest) is equal to or smaller than a predetermined distance (D1, D2) (refer to determinations "Yes" at steps 1010 and 1025 in FIG. 10).

The at least one electric control unit (20, 30, 40, 50) is further configured to acquire the camera image (65) in chronological order when the vehicle (10) is traveling, acquire a temporal change pattern of a position of a particular point (66) in the camera image (65) on the basis of the camera images (65) acquired in chronological order and acquire a first camera height (Hc1) which corresponds to a height of the camera (61) on the basis of the temporal change pattern (refer to a process of a step 840 in FIG. 8). The at least one electric control unit (20, 30, 40, 50) is further configured to acquire a target object position (X, Y) which corresponds to a position of the predetermined target object (70) in the camera image (65) (refer to a process of a step 910 in FIG. 9) when the vehicle (10) is traveling and the predetermined target object (70) is included in the camera image (65) (refer to the determination "Yes" at the step 905 in FIG. 9) and acquire the target object distance (Dest) on the basis of the target object position (X, Y) and the first camera height (Hc1) (refer to a process of a step 845 in FIG. 8 and the process of the step 920 in FIG. 9).

With this configuration of the invention apparatus, when the vehicle is traveling, the target object distance is acquired in consideration of the height of the camera which changes the position of the predetermined target object in the camera image. Thus, the target object distance corresponding to an actual target object distance can be acquired.

The at least one electric control unit (20, 30, 40, 50) is further configured to acquire a second camera height (Hc2) which corresponds to the height of the camera (61) in a situation that a movable load (W) of the vehicle (10) is a maximum load capacity (Wmax) when the vehicle (10) stops (refer to a process of a step 847 in FIG. 8). The at least one electric control unit (20, 30, 40, 50) is further configured to acquire the target object position (X, Y) (refer to the process of the step 910 in FIG. 9) when the vehicle (10) stops and the predetermined target object (70) is included in the camera image (65) (refer to the determination "Yes" at the step 905 in FIG. 9) and acquire the target object distance (Dest) on the basis of the target object position (X, Y) and the second camera height (Hc2) (refer to a process of a step 850 in FIG. 8 and the process of the step 920 in FIG. 9). In particular, the at least one electric control unit (20, 30, 40, 50) may be configured to acquire the target object distance (Dest) which is small when the first camera height (Hc1) is small, compared with when the first camera height (Hc1) is large. In addition, the at least one electric control unit (20, 30, 40, 50) may be configured to acquire the target object distance (Dest) which is small when the second camera height (Hc2) is small, compared with when the second camera height (Hc2) is large.

As the movable load of the vehicle increases, the height of the camera decreases. Therefore, as the movable load of the vehicle increases, the acquired target object distance increases from the actual target object distance. With the configuration of the invention apparatus, when the vehicle stops and thus, the height of the camera cannot be acquired on the basis of the temporal change pattern of the position of the particular point, the target object distance is acquired by using the height of the camera assuming that the movable load of the vehicle is the maximum load capacity. That is, the target object is acquired assuming that the height of the camera is the lowest. Therefore, the target object distance larger than the actual target object distance is unlikely to be acquired. Thus, a possibility that a start timing of a collision prevention control delays with respect to a suitable timing can be decreased.

The at least one electric control unit (20, 30, 40, 50) may be configured to acquire a camera optical axis angle (θc) which corresponds to an angle defined between an optical axis (65a) of the camera (61) and a horizontal plane (PH) on the basis of the temporal change pattern of the position of the particular point (66) in the camera image (65) (refer to the process of the step 840 in FIG. 8). In this case, the at least one electric control unit (20, 30, 40, 50) is further configured to acquire the target object distance (Dest) on the basis of the target object position (X, Y), the first camera height (Hc1) and the camera optical axis angle (θc) (the processes of the steps 845 and 920 in FIGS. 8 and 9) when the vehicle (10) is traveling and the predetermined target object (70) is included in the camera image (65) (refer to the determination "Yes" at the step 905 in FIG. 9). In particular, the at least one electric control unit (20, 30, 40, 50) may be configured to acquire the target object distance (Dest) which is small when the optical axis (61a) of the camera (61) directs downward with respect to the horizontal surface (PH) and the camera optical axis angle (θc) is large, compared with when the optical axis (61a) of the camera (61) directs downward with respect to the horizontal surface (PH) and the camera optical axis angle (θc) is small. In this case, the at least one electric control unit (20, 30, 40, 50) is configured to acquire the target object distance (Dest) which is large when the optical axis (61a) of the camera (61) directs upward with respect to the horizontal surface (PH) and the camera optical axis angle (θc) is large, compared with when the optical axis (61a) of the camera (61) directs upward with respect to the horizontal surface (PH) and the camera optical axis angle (θc) is small. With this configuration of the invention apparatus, when the vehicle is traveling, the target object distance is acquired in consideration of the height of the camera and the camera optical axis angle which change the position of the target object in the camera image. Thus, the target object distance corresponding to the actual target object distance can be surely acquired.

The at least one electric control unit (20, 30, 40, 50) may be configured to acquire a road surface gradient difference (dθ) which corresponds to a difference between a gradient (θn) of a road surface (Rn), on which the vehicle (10) exists, and a gradient (θs) of a road surface (Rs) in front of the vehicle (10) in a traveling direction of the vehicle (10) on the basis of the temporal change pattern of the position of the particular point (66) in the camera image (65) (refer to the process of the step 840 in FIG. 8). In this case, the at least one electric control unit (20, 30, 40, 50) is further configured to acquire the target object distance (Dest) on the basis of the target object position (X, Y), the first camera height (Hc1) and the road surface gradient difference (dθ) (the processes of the steps 845 and 920 in FIGS. 8 and 9) when the vehicle (10) is traveling and the predetermined target object (70) is included in the camera image (65) (refer to the determination "Yes" at the step 905 in FIG. 9). In particular, the at least one electric control unit (20, 30, 40, 50) may be configured to acquire the target object distance (Dest) which is small when the road surface gradient difference (dθ) is positive and large, compared with when the road surface gradient difference (dθ) is positive and small. In this case, the at least one electric control unit (20, 30, 40, 50) is configured to acquire the target object distance (Dest) which is large when the road surface gradient difference (dθ) is negative and an absolute value of the road surface gradient difference (dθ) is large, compared with when the road surface gradient difference (dθ) is negative and the absolute value of the road surface gradient difference (dθ) small. With this configuration of the invention apparatus, when the vehicle is traveling, the target object distance is acquired in consideration of the height of the camera and the road surface gradient difference which change the position of the target object in the camera image. Thus, the target object distance corresponding to the actual target object distance can be surely acquired.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

BRIEF DESCRIPTION OF THE DRAWINGS

FIG. 5A is a view for showing the heights of the vehicle and the camera when a movable load changes from zero to a maximum load capacity.

FIG. 5B is a view for showing a change of an extension direction of the optical axis of the camera when a front part of a body of the vehicle becomes lowers than a rear part of the body of the vehicle.

FIG. 5C is a view for showing the camera image and the target object when the height of the camera or the extension direction of the optical axis of the camera changes.

DESCRIPTION OF THE PREFERRED EMBODIMENTS

Below, with reference to the drawings, a vehicle driving assist apparatus according to an embodiment of the invention will be described. Hereinafter, the vehicle driving assist apparatus according to the embodiment of the invention will be referred to as "the embodiment apparatus". The embodiment apparatus is applied to a vehicle 10 shown in FIG. 1.

The embodiment apparatus includes a driving assist ECU 20, an engine ECU 30, a brake ECU 40 and an alert ECU 50. The ECUs are connected to each other via a communication/sensor system CAN (i.e., a communication/sensor system Controller Area Network) 100 such that the ECUs send and receive data to and from each other.

Each of the ECUs is an electric control unit which is an electronic control circuit including a microcomputer as a main part including a CPU, a ROM, a RAM, an interface and the like. The CPU realizes various functions by executing instructions or routines stored in a memory (i.e., the ROM). The ECUs may be integrated to a single ECU.

Figure 2:
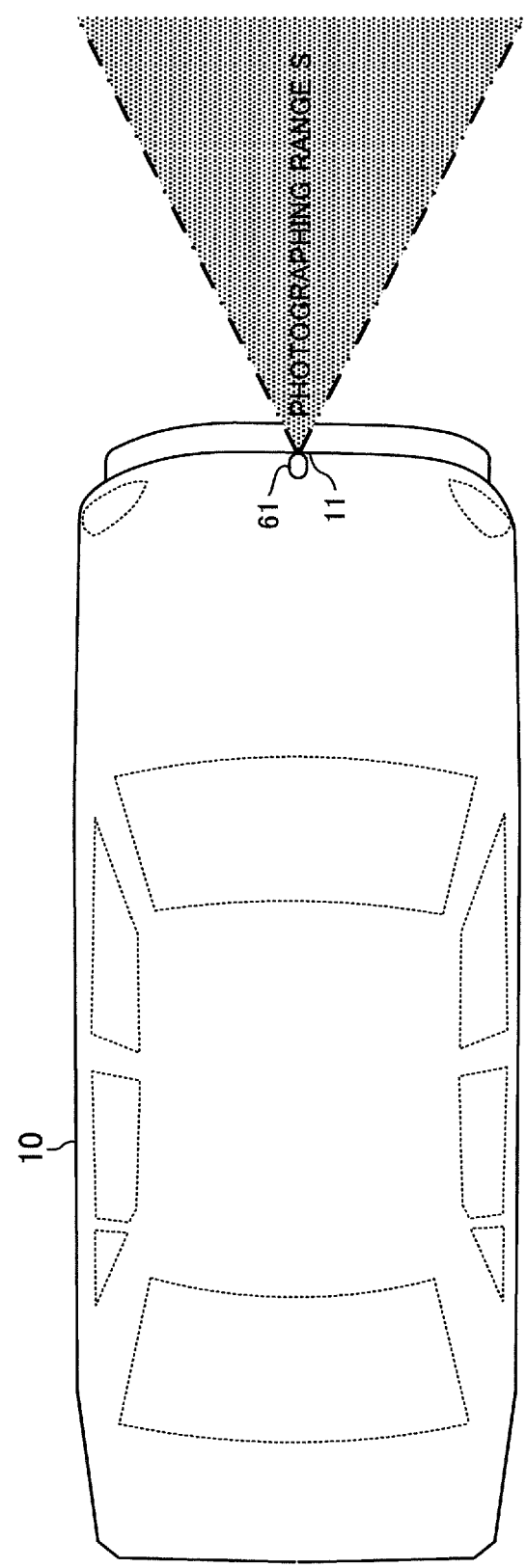
FIG. 2 is a view for showing a vehicle shown in FIG. 1.

The vehicle 10 includes a camera device 60. The camera device 60 includes a camera 61 and a camera ECU 62. The camera 61 is a well-known CCD camera. As shown in FIG. 2, the camera 61 is provided on a front center part 11 of the vehicle 10. The camera 61 takes an image of a landscape within a photographing range S in front of the vehicle 10.

Figure 1:
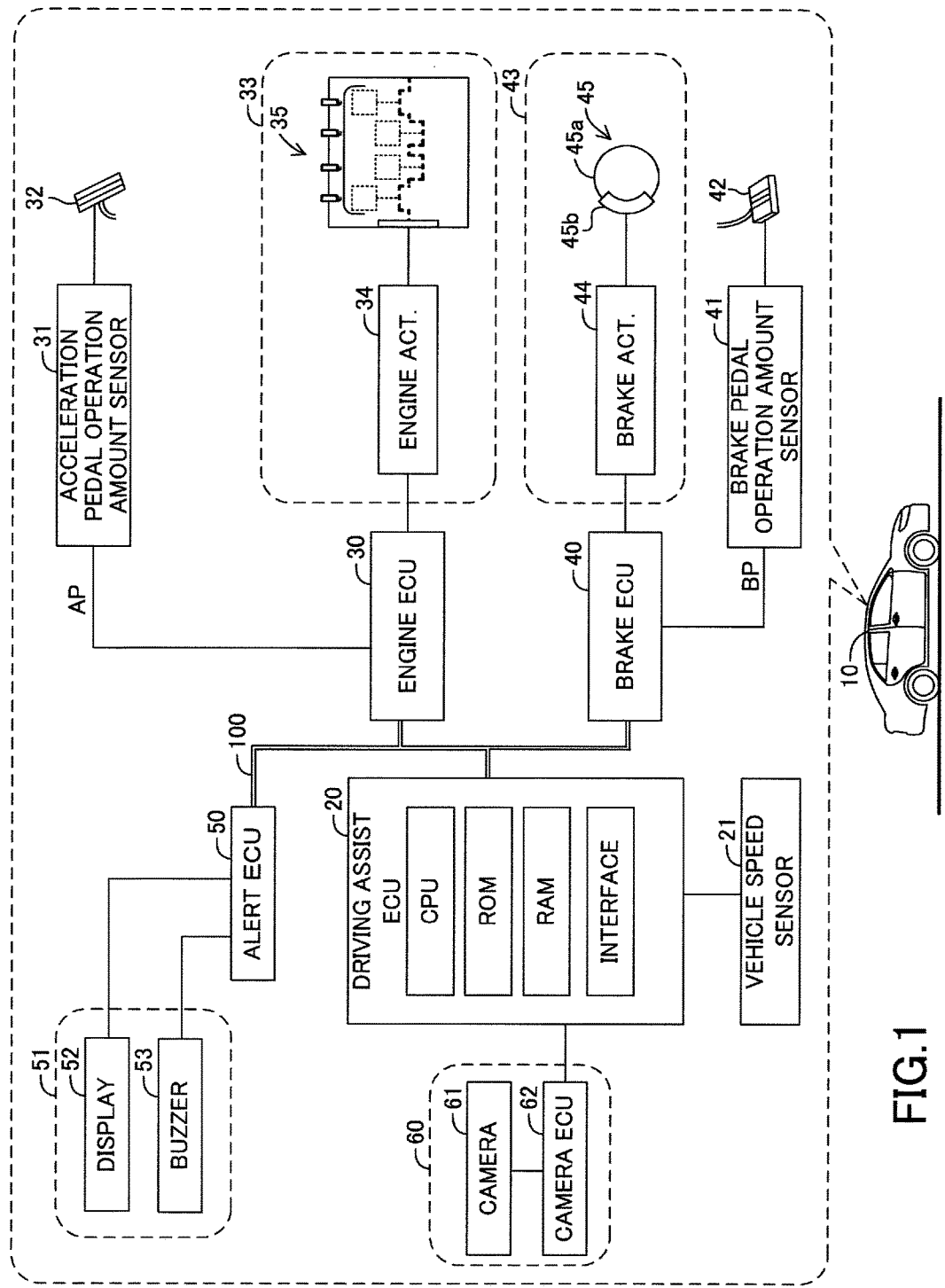
FIG. 1 is a view for showing a configuration of a vehicle driving assist apparatus according to an embodiment of the invention.

As shown in FIG. 1, the camera 61 is electrically connected to the camera ECU 62. The camera ECU 62 is electrically connected to the driving assist ECU 20. The camera ECU 62 produces image data on the basis of the image taken by the camera 61. The camera ECU 62 sends the image data to the driving assist ECU 20.

The vehicle 10 includes a vehicle speed sensor 21. The vehicle speed sensor 21 is electrically connected to the driving assist ECU 20. The vehicle speed sensor 21 detects a traveling speed SPD of the vehicle 10 and outputs a signal representing the detected traveling speed SPD. The driving assist ECU 20 acquires the traveling speed SPD of the vehicle 10 on the basis of the signal output from the vehicle speed sensor 21. Hereinafter, the traveling speed SPD of the vehicle 10 is referred to as "the vehicle speed SPD".

The vehicle 10 includes an acceleration pedal 32. The acceleration pedal 32 is electrically connected to an acceleration pedal operation amount sensor 31. The acceleration pedal operation amount sensor 31 is electrically connected to the engine ECU 30. The acceleration pedal operation amount sensor 31 detects an operation amount AP of the acceleration pedal 32 and outputs a signal representing the operation amount AP. The engine ECU 30 acquires the operation amount AP on the basis of the signal output from the acceleration pedal operation amount sensor 31. Hereinafter, the operation amount AP will be referred to as "the acceleration pedal operation amount AP".

The vehicle 10 includes an internal combustion engine 33. The engine 33 includes engine actuators 34 and an engine body 35. The engine actuators 34 include a throttle valve actuator (not shown), fuel injector actuators (not shown) and the like. Fuel injectors (not shown) are provided on the engine body 35. The fuel injectors are activated by the fuel injector actuators, respectively.

The engine ECU 30 is electrically connected to the engine actuators 34. The engine ECU 30 activates the engine actuators 34 and the like to control a torque generated by the engine 33, thereby to control a driving force of the vehicle 10.

The vehicle 10 includes a brake pedal 42. The brake pedal 42 is electrically connected to a brake pedal operation amount sensor 41. The brake pedal operation amount sensor 41 is electrically connected to the brake ECU 40. The brake pedal operation amount sensor 41 detects an operation amount BP of the brake pedal 42 and outputs a signal representing the operation amount BP. The brake ECU 40 acquires the operation amount BP on the basis of the signal output from the brake pedal operation amount sensor 41.

The vehicle 10 includes a brake device 43. The brake device 43 includes a brake actuator 44 and a friction brake mechanism 45. The brake actuator 44 is a fluidic control actuator. The friction brake mechanism 45 includes a brake disc 45a secured to each of wheels of the vehicle 10, at least one brake caliper 45b secured on a body of the vehicle 10, at least one brake pad (not shown) and the like.

The brake ECU 40 is electrically connected to the brake actuator 44. The brake ECU 40 controls an activation amount of the brake actuator 44 to control a friction braking force generated by the friction brake mechanism 45, thereby to control a braking force generated by the brake device 43 which is exerted to the vehicle 10.

The alert ECU 50 is electrically connected to an alerting device 51. The alerting device 51 includes a display 52 and a buzzer 53. The display 52 is provided at a position which a driver of the vehicle 10 sitting on a driver's seat can see the display 52.

<Summary of Operation of Embodiment Apparatus>

Figure 3A:
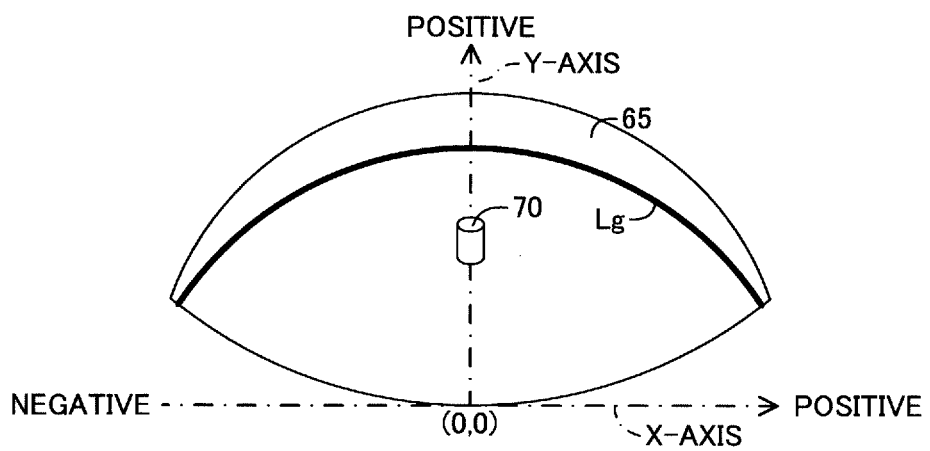
FIG. 3A is a view for showing a camera image and a target object.

Next, a summary of an operation of the embodiment apparatus will be described. As shown in FIG. 3A, the driving assist ECU 20 of the embodiment apparatus acquires the images 65 of the landscape taken by the camera 61 in chronological order on the basis of the image data sent from the camera ECU 62. In FIG. 3A, a line Lg shows a boundary between the ground and the sky in the image 65. Hereinafter, the image 65 of the landscape will be referred to as "the camera image 65".

When a target object 70 is included in the acquired camera image 65, the driving assist ECU 20 acquires a horizontal position X and a vertical position Y representing a position which the target object 70 contacts the ground in the camera image 65. The target object 70 is an object or an obstacle for a traveling of the vehicle 10.

The vertical position Y is a position defined with respect to a Y-axis which extends passing an origin (0, 0) in a vertical direction. In this embodiment, the origin (0, 0) is a position which is central in a horizontal direction and lowermost in the vertical direction in the camera image 65. A value of the vertical position Y is positive when the vertical position Y is at an upper side of the origin (0, 0) and an absolute value of the vertical position Y increases as the vertical position Y moves upward away from the origin (0, 0).

The horizontal position X is a position defined with respect to an X-axis which extends passing the origin (0, 0) in the horizontal direction. A value of the horizontal position X is positive when the horizontal position X is at a right side of the origin (0, 0) and an absolute value of the horizontal position X increases as the horizontal position X moves rightward away from the origin (0, 0). On the other hand, a value of the horizontal position X is negative when the horizontal position X is at a left side of the origin (0, 0) and the absolute value of the horizontal position X increases as the horizontal position X moves leftward away from the origin (0, 0).

Figure 3B:
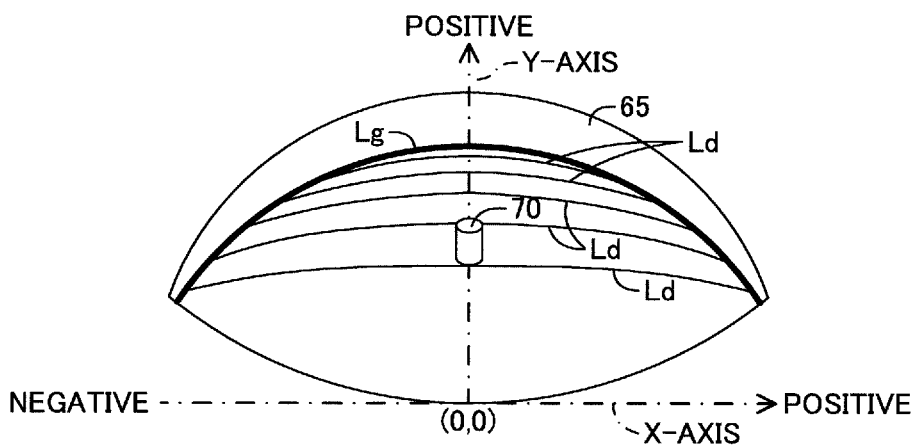
FIG. 3B is a view similar to FIG. 3A and which shows equidistant lines in the camera image.

Each of lines Ld shown in FIG. 3B is an equidistant line obtained by connecting positions having the same distance D from the vehicle 10 in the camera image 65. Thus, actual distances in the landscape each corresponding to a distance between the adjacent lines Ld are equal to each other. As shown in FIG. 3B, the distance between the particular adjacent lines Ld is smaller than the distance between the adjacent lines Ld located at an upper side of the particular adjacent lines Ld.

The driving assist ECU 20 stores a look-up table MapDest(X,Y) in the ROM thereof. The look-up table MapDest(X,Y) represents a relationship between the horizontal and vertical positions X and Y and the target object distance Dest between the vehicle 10 and the target object 70. In particular, the look-up table MapDest(X,Y) represents the relationship between the horizontal and vertical positions X and Y and the target object distance Dest when following three conditions (1) to (3) are satisfied. Hereinafter, the look-up table MapDest(X,Y) will be referred to as "the base table MapDest(X,Y)".

<First Condition>

Figure 4A:
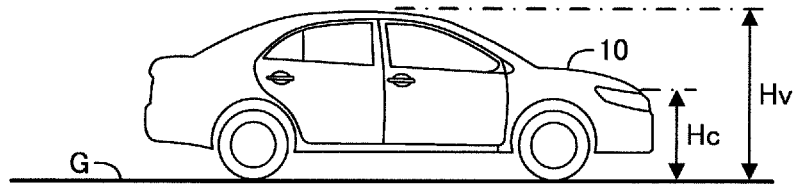
FIG. 4A is a view used for describing a height of the vehicle and a height of a camera.

As shown in FIG. 4A, a first condition (1) is that a height Hv of the vehicle 10 from the ground or road surface G corresponds to a height Hvb of the vehicle 10 when no person is in the vehicle 10 and no load is on the vehicle 10. In other words, the first condition (1) is that the height Hv of the vehicle 10 corresponds to the height Hvb when movable load W of the vehicle 10 is zero, i.e., when a weight of the vehicle 10 corresponds to a base load Wb. That is, the first condition (1) is that a height Hc of the camera 61 from the ground or road surface G corresponds to a height Hcb of the camera 61 when the movable load W of the vehicle 10 is zero. Hereinafter, the height Hv will be referred to as "the vehicle height Hv", the height Hvb will referred to as "the base height Hvb". The movable load W will be referred to as "the vehicle movable load W". The height Hc will be referred to as "the camera height Hc" and the height Hcb will be referred to as "the base camera height Hcb".

<Second Condition>

Figure 4B:
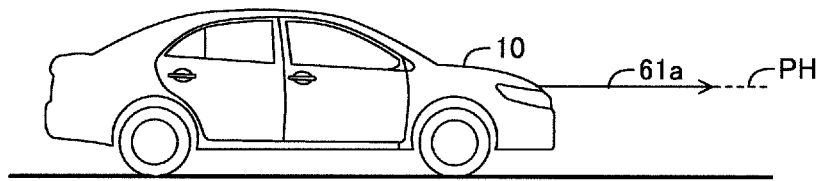
FIG. 4B is a view used for describing an angle of an optical axis of the camera with respect to a horizontal plane.

As shown in FIG. 4B, a second condition (2) is that an angle θc defined between a horizontal surface PH and an optical axis 61a of the camera 61 is zero, i.e., a base optical axis angle θcb. In this embodiment, the angle θc is positive when the optical axis 61a of the camera 61 directs downward with respect to the horizontal plane PH. Hereinafter, the angle θc will be referred to as "the camera optical axis θc".

<Third Condition>

Figure 4C:
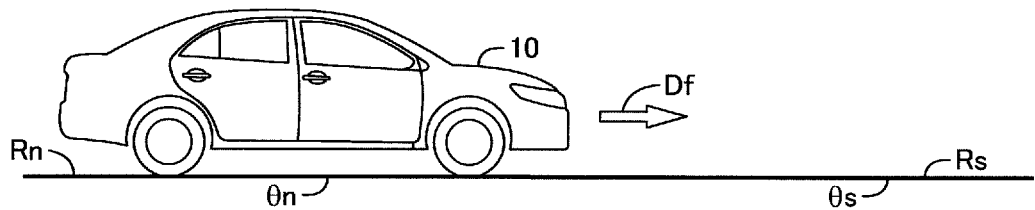
FIG. 4C is a view used for describing a road surface gradient difference.

As shown in FIG. 4C, a third condition (3) is that an angle dθ defined between a road surface gradient θn of a road Rn on which the vehicle 10 travels and a road surface gradient θs of a road Rs in front of the vehicle 10 in a traveling direction of the vehicle 10 included in the camera image 65 (dθ=θs−θn) is zero, i.e., a base gradient difference dθb. Hereinafter, the angle dθ will be referred to as "the road surface gradient difference dθ".

According to the base table MapDest(X,Y), when the vertical position Y is constant, the acquired target object distance Dest increases as the absolute value of the horizontal position X increases, that is, the horizontal position X moves rightward or leftward away from the Y-axis. Further, according to the base table MapDest(X,Y), when the horizontal position X is constant, the acquired target object distance Dest increases as the absolute value of the vertical position Y increases, that is, the vertical position Y moves upward away from the X-axis.

<Base Table Correction>

The vehicle height Hv decreases as the vehicle movable load W increases. For example, as shown in FIG. 5A, when the vehicle movable load W changes from zero to a maximum load capacity Wmax, the vehicle height Hv changes from the base vehicle height Hvb to a minimum vehicle height Hvmin. Therefore, the camera height Hc also changes from the base camera height Hcb to a minimum camera height Hcmin.

The maximum load capacity Wmax corresponds to a value obtained by subtracting the base weight Wb of the vehicle 10 when the vehicle movable load W is zero from a total vehicle weight Wtotal which is described in specification sheets of the vehicle 10 (Wmax=Wtotal−Wb). Alternatively, when the total vehicle weight Wtotal is not described in the specification sheets of the vehicle 10, the maximum load capacity Wmax corresponds to a permitted maximum weight of the vehicle movable load calculated in accordance with regulations.

As shown in FIG. 5C, when the camera height Hc decreases and an actual distance Dact between the vehicle 10 and the target object 70 is constant, a position of the target object 70 in the camera image 65 is located at an upper side of the position of the target object 70 in the camera image 65 in a situation that the camera height Hc corresponds to the base camera height Hcb. Therefore, the vertical position Y of the target object 70 is larger than the vertical position Y of the target object 70 in the situation that the camera height Hc corresponds to the base camera height Hcb. Hereinafter, the distance Dact will be referred to as "the actual target object distance Dact".

According to the base table MapDest(X,Y), the acquired target object distance Dest increases as the value of the vertical position Y increases. Therefore, when acquiring the target object distance Dest by applying, to the base table MapDest(X,Y), the horizontal and vertical positions X and Y acquired in a situation that the camera height Hc decreases and thus the value of the vertical position Y increases, the acquired target object distance Dest is larger than the actual target object distance Dact.

In addition, as shown in FIG. 5B, when a front part of the vehicle 10 becomes lower than a rear part of the vehicle 10 and thereby, the camera optical axis angle θc becomes larger positively than zero, i.e., than the base optical axis θcb and the actual target object distance Dact is constant, the position of the target object 70 in the camera image 65 is at the upper side of the position of the target object 70 in a situation that the camera optical angle θc is zero. Therefore, when acquiring the target object distance Dest by applying the acquired horizontal and vertical positions X and Y to the base table MapDest(X,Y), the acquired target object distance Dest is larger than the actual target object distance Dact.

Figure 6A:
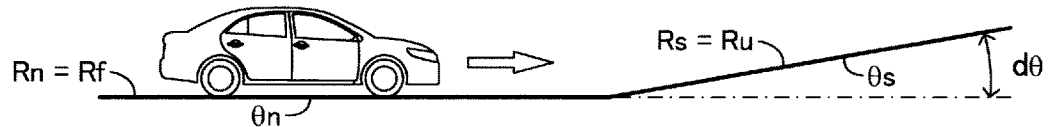
FIG. 6A is a view for showing a scene which there is an upward slope in front of the vehicle in a traveling direction of the vehicle when the vehicle travels on a flat road.

Further, as shown in FIG. 6A, when the vehicle 10 travels on a flat road Rf and there is an upward slope Ru in front of the vehicle 10 in the traveling direction of the vehicle 10, the road surface gradient difference dθ is larger positively than zero, i.e., the base gradient difference dθb. In this regard, when the actual target object distance Dact is constant, the position of the target object 70 in the camera image 65 is at the upper side of the position of the target object 70 in a situation that the road surface gradient difference dθ is zero. Therefore, when acquiring the target object distance Dest by applying the acquired horizontal and vertical positions X and Y to the base table MapDest(X,Y), the acquired target object distance Dest is larger than the actual target object distance Dact.

Figure 6B:
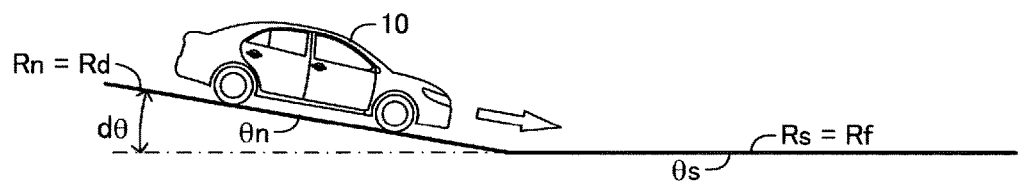
FIG. 6B is a view for showing a scene which there is a downward slope in front of the vehicle in the traveling direction of the vehicle when the vehicle travels on the flat road.

Similarly, as shown in FIG. 6B, when the vehicle 10 travels on a downward slope Rd and there is the flat road Rf in front of the vehicle 10 in the traveling direction of the vehicle 10, the road surface gradient difference dθ is larger positively than zero, i.e., the base gradient difference dθb. Therefore, when acquiring the target object distance Dest by applying the acquired horizontal and vertical positions X and Y to the base table MapDest(X,Y), the acquired target object distance Dest is larger than the actual target object distance Dact.

When the acquired target object distance Dest is larger than the actual target object distance Dact, a timing of a start of each of an alerting control, a torque limit control and an automatic braking control described later may be delayed, compared with a case that the acquired target object distance Dest is equal to the actual target object distance Dact. Accordingly, the embodiment apparatus is configured to acquire the target object distance Dest as described below.

Figure 7:
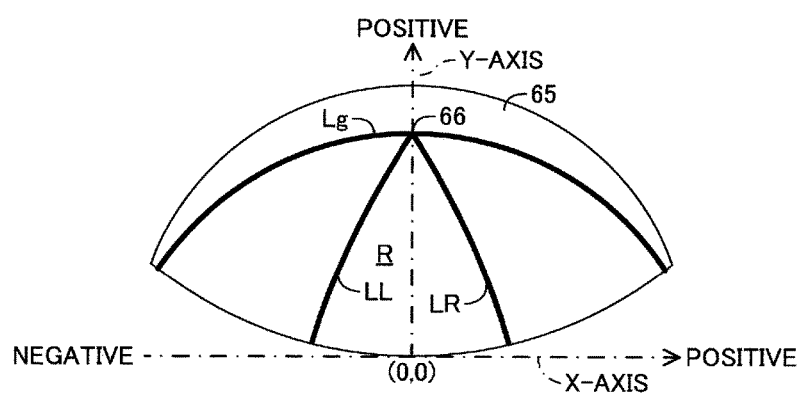
FIG. 7 is a view similar to FIG. 3A and which is used for describing a vanishing point.

As shown in FIG. 7, when the vehicle 10 travels on a road R, which lane lines LR and LL are provided parallel to each other at right and left sides of the road R, images of the lane lines LR and LL are included in the camera image 65. In this case, an image of a vanishing point 66 which the lane line LR crosses the lane line LL is included in the camera image 65. It is known that a pattern of a temporal change of a position of the vanishing point 66 in the camera image 65 when the vehicle 10 is traveling, varies depending on the camera height Hc, the camera optical angle θc and the road surface gradient difference dθ.

Accordingly, when the vehicle 10 is traveling, the embodiment apparatus acquires the camera height Hc (hereinafter, will be referred to as "the first camera height Hc1"), the camera optical angle θc and the road surface gradient difference dθ on the basis of the pattern of the temporal change of the position of the vanishing point 66 in the camera image 65. The embodiment apparatus corrects the base table MapDest(X,Y) using the acquired first camera height Hc1, the acquired camera optical axis angle θc and the acquired road surface gradient difference dθ.

In particular, the embodiment apparatus corrects the base table MapDest(X,Y) such that the target object distance Dest acquired by applying the same horizontal and vertical positions X and Y to the base table MapDest(X,Y) decreases as the first camera height Hc1 decreases from the base camera height Hcb.

In addition, the embodiment apparatus corrects the base table MapDest(X,Y) such that the target object distance Dest of the base table MapDest(X,Y) corresponding to the same horizontal and vertical positions X and Y decreases as the camera optical axis angle θc increases positively from zero.

Furthermore, the embodiment apparatus corrects the base table MapDest(X,Y) such that the target object distance Dest of the base table MapDest(X,Y) corresponding to the same horizontal and vertical positions X and Y decreases as the road surface gradient difference dθ increases positively from zero.

When the vehicle 10 is traveling, the embodiment apparatus acquires the target object distance Dest by applying the acquired horizontal and vertical positions X and Y to the corrected base table MapDest(X,Y).

Thereby, the target object distance Dest is acquired by using the base table MapDest(X,Y) corrected on the basis of the first camera height Hc1, the camera optical axis angle θc and the road surface gradient difference dθ which change the vertical position Y of the target object 70 in the camera image 65. Thus, when the vehicle 10 is traveling, the target object distance Dest corresponding to the actual target object distance Dact can be acquired.

<Base Table Correction During Vehicle Stop>

On the other hand, when the vehicle 10 stops, the embodiment apparatus cannot acquire the pattern of the temporal change of the position of the vanishing point 66 in the camera image 65. Accordingly, the embodiment apparatus previously stores the camera height Hc when the vehicle movable load W corresponds to the maximum load capacity Wmax, i.e., the minimum camera height Hcmin as a second camera height Hc2 in the ROM of the driving assist ECU 20.

When the vehicle 10 stops, the embodiment apparatus corrects the base table MapDest(X,Y) on the basis of the second camera height Hc2 such that the target object distance Dest in the base table MapDest(X,Y) corresponding to the same horizontal and vertical positions X and Y corresponds to the target object distance in a situation that the vehicle movable load W of the vehicle 10 is the maximum load capacity Wmax.

Then, when the vehicle 10 stops, the embodiment apparatus acquires the target object distance Dest by applying the acquired horizontal and vertical positions X and Y to the corrected base table MapDest(X,Y). Thereby, the target object distance Dest acquired by applying the acquired horizontal and vertical positions X and Y to the corrected base table MapDest(X,Y), is equal to or smaller than the target object distance Dest acquired by applying the acquired horizontal and vertical positions X and Y to the non-corrected base table MapDest(X,Y).

As described above, as the vehicle movable load W increases, the camera height Hc decreases. Therefore, as the vehicle movable load W increases, the acquired target object distance Dest increases from the actual target object distance Dact. According to the embodiment apparatus, when the vehicle 10 stops and thus, the camera height Hc cannot be acquired on the basis of the pattern of the temporal change of the position of the vanishing point 66, the target object distance Dest is acquired by using the second camera height Hc2 which corresponds to the camera height Hc assuming that the vehicle movable load W is the maximum load capacity Wmax. That is, the target object distance Dest is acquired assuming that the camera height Hc is the smallest. Thus, the acquired target object distance Dest is unlikely to be larger than the actual target object distance Dact.

Further, as can be understood with reference to FIG. 3B, an error of the target object distance Dest with respect to the actual target object distance Dact when the vertical position Y of the target object 70 in the camera image 65 separates upward from a particular position Yp by a particular length is smaller than an error of the target object distance Dest with respect to the actual target object distance Dact when the vertical position Y of the target object 70 in the camera image 65 separates downward from the particular position Yp by the particular length.

The embodiment apparatus acquires the target object distance Dest by using the second camera height Hc2 which corresponds to the camera height Hc in the situation that the vehicle movable load W is the maximum load capacity Wmax. Therefore, the embodiment apparatus acquires the target object distance Dest assuming that the vertical position Y of the target object 70 in the camera image 65 separates upward from the position Y (i.e., an appropriate vertical position Ys) corresponding to the actual vehicle movable load W. Thus, the error of the target object distance Dest acquired by the embodiment apparatus with respect to the actual target object distance Dact is smaller than the error of the target object distance Dest with respect to the actual target object distance Dact acquired assuming that the vertical position Y of the target object 70 in the camera image 65 separates downward from the vertical position Y corresponding to the actual vehicle movable load W.

<Alerting Control>

When the target object 70 is within a predicted traveling range of the vehicle 10 and the target object distance Dest becomes smaller than a predetermined distance D1, the embodiment apparatus sends, to the alert ECU 50, a signal SKstart for causing the alert ECU 50 to start an alerting control which is one of controls for preventing a collision of the vehicle 10 against the target object 70. Hereinafter, the predetermined distance D1 will be referred to as "the first threshold distance D1", the signal SKstart will be referred to as "the alerting control start command signal SKstart" and the control for preventing the collision of the vehicle 10 against the target object 70 will be referred to as "the collision prevention control".

When receiving the alerting control start command signal SKstart, the alert ECU 50 starts the alerting control to light the display 52 to perform an alerting display for indicating that the target object 70 exists and activate the buzzer 53 to generate alerting sounds for informing the driver of the vehicle 10 of an existence of the target object 70.

When the target object 70 is outside of the predicted traveling range of the vehicle 10 or the target object distance Dest becomes larger than the first threshold distance D1, the driving assist ECU 20 sends, to the alert ECU 50, a signal SKstop for causing the alert ECU 50 to stop the alerting control. Hereinafter, the signal SKstop will be referred to as "the alerting control stop command signal SKstop".

When receiving the alerting control stop command signal SKstop, the alert ECU 50 stops the alerting control. Thereby, the alerting display by the display 52 and the generation of the alerting sounds by the buzzer 53 stop.

According to the alerting control described above, the driver is likely to know the existence of the target object 70.

Therefore, an operation of the driver for avoiding the collision of the vehicle 10 against the target object 70 (e.g., a steering operation of the driver for controlling the traveling direction of the vehicle 10 and a braking operation of the driver for braking the vehicle 10) can be encouraged. Thus, the vehicle 10 is likely to travel safely.

<Torque Limit Control and Automatic Braking Control>

When the target object 70 is within the predicted traveling range of the vehicle 10 and the target object distance Dest becomes equal to or smaller than a distance D2 which is smaller than the first threshold distance D1, the driving assist ECU 20 sends, to the engine ECU 30, a signal SBstart for causing the engine ECU 30 to start a torque limit control which is one of the collision prevention controls and sends, to the brake ECU 40, a signal SBstart for causing the brake ECU 40 to start an automatic braking control which is one of the collision prevention controls. Hereinafter, the signal STstart will be referred to as "the torque limit control start command signal STstart" and the signal SBstart will be referred to as "the automatic braking control start command signal SBstart".

When receiving the torque limit control start command signal STstart, the engine ECU 30 starts the torque limit control to control the activation of the engine actuators 34 such that the torque output from the engine 33 becomes zero. In particular, the engine ECU 30 renders an amount of fuel injected from the fuel injectors zero.

According to the torque limit control, the torque output from the engine 33 is zero even when the acceleration pedal operation amount AP is larger than zero. Therefore, the vehicle 10 is decelerated. Thus, a possibility that the vehicle 10 collides against the target object 70 can be decreased.

When receiving the automatic braking control start command signal SBstart, the brake ECU 40 starts to the automatic braking control to calculate a value of the friction braking force necessary for stopping the vehicle 10 before the vehicle 10 reaches the target object 70 on the basis of the target object distance Dest and the vehicle speed SPD. The brake ECU 40 controls the activation of the brake actuator 44 such that the calculated value of the friction braking force is applied to each of the wheels of the vehicle 10 from the brake device 43.

According to the automatic braking control, the friction braking force is automatically applied to each of the wheels of the vehicle 10 from the brake device 43 even when the brake pedal operation amount BP is zero. Thereby, the vehicle 10 stops before the vehicle 10 reaches the target object 70. Thus, the collision of the vehicle 10 against the target object 70 can be prevented.

When the vehicle 10 is outside of the predicted traveling range of the vehicle 10 or the target object distance Dest becomes larger than the second threshold distance D2, the driving assist ECU 20 sends, to the engine ECU 30, a signal STstop for causing the engine ECU 30 to stop the torque limit control and sends, to the brake ECU 40, a signal SBstop for causing the brake ECU 40 to stop the automatic braking control. Hereinafter, the signal STstop will be referred to as "the torque limit control stop command signal STstop and the signal SBstop will be referred to as "the automatic braking control stop command signal SBstop".

When receiving the STstop, the engine ECU 30 stops the torque limit control. When receiving the automatic braking control stop command signal SBstop, the brake ECU 40 stops the automatic braking control.

<Concrete Operation of Embodiment Apparatus>

Next, a concrete operation of the embodiment apparatus will be described. The CPU of the driving assist ECU 20 of the embodiment apparatus is configured or programmed to execute a routine shown by a flowchart in FIG. 8 each time a predetermined time elapses. Therefore, at a predetermined timing, the CPU starts a process from a step 800 and then, proceeds with the process to a step 805 to determine whether or not the vehicle 10 includes a vehicle height sensor.

Figure 8:
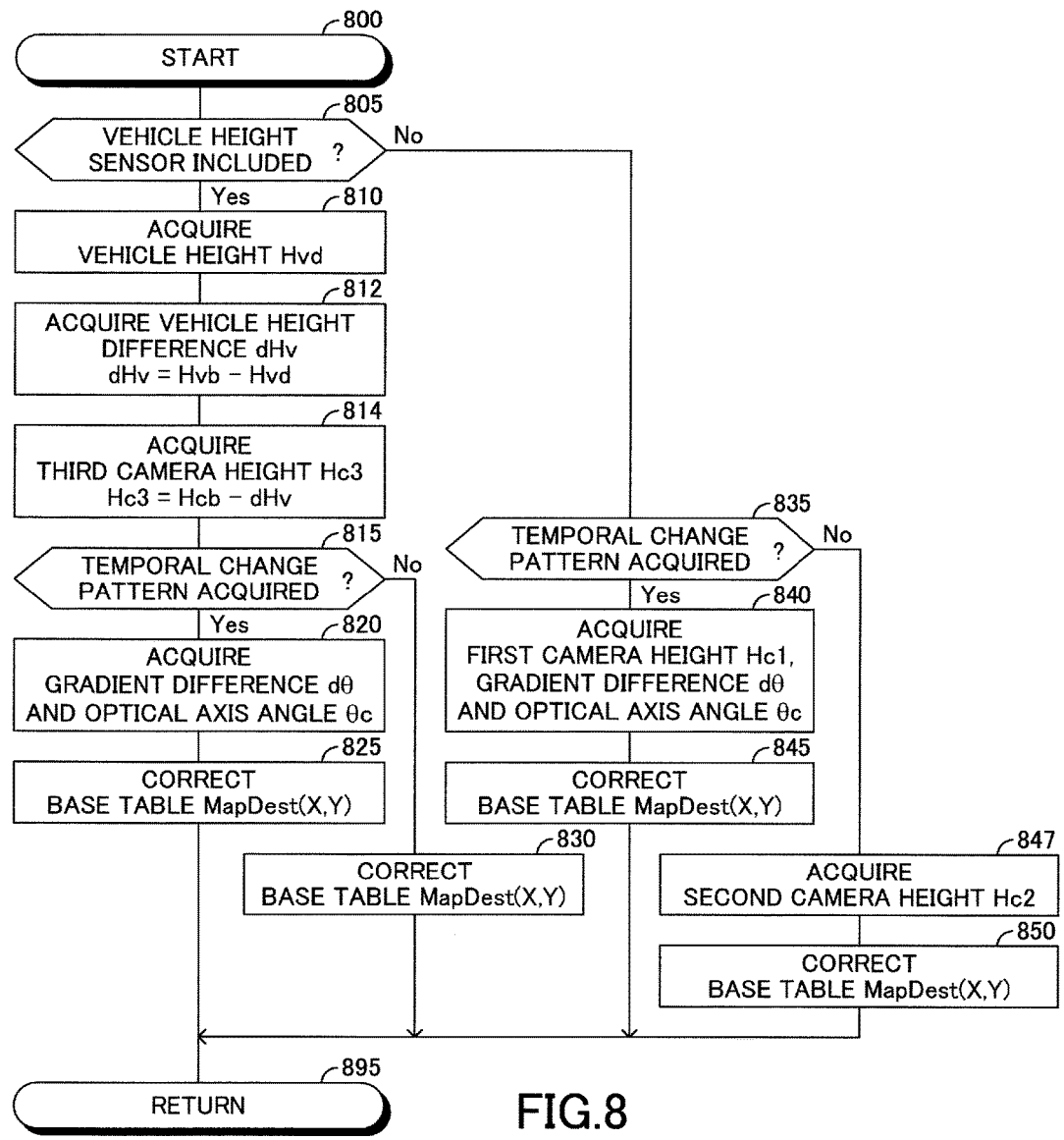
FIG. 8 is a flowchart for showing a routine executed by a CPU of a driving assist ECU shown in FIG. 1.

The routine shown in FIG. 8 can be applied to a vehicle which includes the vehicle height sensor. The vehicle 10 includes no vehicle height sensor. Therefore, the CPU determines "No" at the step 805 and then, proceeds with the process to a step 835 to determine whether or not the CPU can acquire the pattern of the temporal change of the position of the vanishing point 66 in the camera image 65, that is, the CPU can acquire the movable load of the vehicle 10 and the road surface gradient difference dθ.

When the CPU can acquire the pattern of the temporal change of the position of the vanishing point 66 in the camera image 65, the CPU determines "Yes" at the step 835 and then, sequentially executes processes of steps 840 and 845 as described below. Then, the CPU proceeds with the process to a step 895 to terminate this routine once.

Step 840: The CPU acquires the first camera height Hc1, the road surface gradient difference dθ and the camera optical axis angle θc on the basis of the pattern of the temporal change of the position of the vanishing point 66 in the camera image 65.

Step 845: The CPU corrects the base table MapDest(X,Y) on the basis of the first camera height Hc1, the road surface gradient difference dθ and the camera optical axis angle θc acquired at the step 840 and stores the corrected base table MapDest(X,Y) in the RAM of the driving assist ECU 20. In this case, at a step 920 shown in FIG. 9 described later, the CPU acquires the target object distance Dest by using the base table MapDest(X,Y) corrected at the step 845.

When the CPU cannot acquire the pattern of the temporal change of the position of the vanishing point 66 in the camera image 65 upon an execution of the process of the step 835, the CPU determines "No" at the step 835 and then, sequentially executes processes of steps 847 and 850 as described below. Then, the CPU proceeds with the process to the step 895 to terminate this routine once.

Step 847: The CPU acquires the second camera height Hc2 which corresponds to the camera height Hc in the situation that the vehicle movable load W is the maximum load capacity Wmax from the ROM of the driving assist ECU 20.

Step 850: The CPU corrects the base table MapDest(X,Y) on the basis of the second camera height Hc2 and stores the corrected base table MapDest(X,Y) in the RAM of the driving assist ECU 20. In this case, at the step 920 shown in FIG. 9 described later, the CPU acquires the target object distance Dest by using the base table MapDest(X,Y) corrected at the step 850.

When the vehicle includes the vehicle height sensor, the CPU determines "Yes" at the step 805 and then, sequentially executes processes of steps 810 to 814 as described below. Then, the CPU proceeds with the process to a step 815.

Step 810: The CPU acquires a vehicle height Hvd on the basis of a signal sent from the vehicle height sensor.

Step 812: The CPU acquires or calculates a vehicle height difference dHv by subtracting the vehicle height Hvd acquired at the step 810 from the base vehicle height Hvb (dHv=Hvb−Hvd).

Step 814: The CPU acquires or calculates a third camera height Hc3 by subtracting the vehicle height difference dHv from the base camera height Hcb (Hc3=Hcb−Hvd).

When the CPU proceeds with the process to the step 815, the CPU determines whether or not the CPU can acquire the pattern of the temporal change of the position of the vanishing point 66 in the camera image 65, that is, the CPU can acquire the road surface gradient difference dθ. When the CPU can acquire the pattern of the temporal change of the position of the vanishing point 66 in the camera image 65, the CPU determines "Yes" at the step 815 and then, sequentially executes processes of steps 820 and 825. Then, the CPU proceeds with the process to the step 895 to terminate this routine once.

Step 820: The CPU acquires the road surface gradient difference dθ and the camera optical axis angle θc on the basis of the pattern of the temporal change of the position of the vanishing point 66 in the camera image 65.

Step 825: The CPU corrects the base table MapDest(X,Y) on the basis of the third camera height Hc3 acquired at the step 814 and the road surface gradient difference dθ and the camera optical axis angle θc acquired at the step 820 and stores the corrected base table MapDest(X,Y) in the RAM of the driving assist ECU 20. In this case, at the step 920 shown in FIG. 9 described later, the CPU acquires the target object distance Dest by using the base table MapDest(X,Y) corrected at the step 825.

When the CPU cannot acquire the pattern of the temporal change of the position of the vanishing point 66 in the camera image 65 upon an execution of the process of the step 815, the CPU determines "No" at the step 815 and then, proceeds with the process to a step 830 to correct the base table MapDest(X,Y) on the basis of the third camera height Hc3 acquired at the step 814 and store the corrected base table MapDest(X,Y) in the RAM of the driving assist ECU 20. In this case, at the step 920 shown in FIG. 9 described later, the CPU acquires the target object distance Dest by using the base table MapDest(X,Y) corrected at the step 830.

Then, the CPU proceeds with the process to the step 895 to terminate this routine once.

<Acquisition of Target Object Distance>

Figure 9:
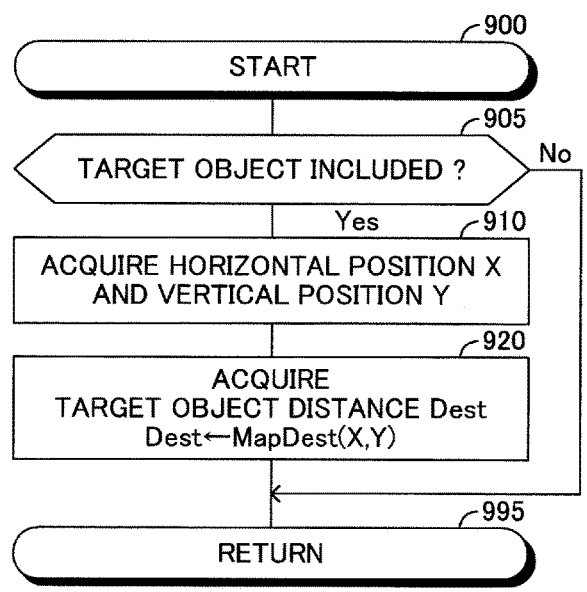
FIG. 9 is a flowchart for showing a routine executed by the CPU.

Further, the CPU is configured or programmed to execute a routine shown by a flowchart in FIG. 9 each time a predetermine time elapses. Therefore, at a predetermined timing, the CPU starts a process from a step 900 and then, proceeds with the process to a step 905 to determine whether or not the target object 70 is included in the camera image 65.

When the target object 70 is included in the camera image 65, the CPU determines "Yes" at the step 905 and then, sequentially executes processes of steps 910 and 920 as described below. Then, the CPU proceeds with the process to a step 995 to terminate this routine once.

Step 910: The CPU acquires the horizontal and vertical positions X and Y of the target object 70 in the camera image 65.

Step 920: The CPU acquires the target object distance Dest by applying the horizontal and vertical positions X and Y to the updated base table MapDest(X,Y) stored in the RAM of the driving assist ECU 20 and stores the acquired target object distance Dest in the RAM of the driving assist ECU 20.

When the target object 70 is not included in the camera image 65 upon an execution of the process of the step 905, the CPU determines "No" at the step 905 and then, proceeds with the process directly to the step 995 to terminate this routine once.

\<Automatic Braking Control, Torque Limit Control and Alerting Control\>

Figure 10:
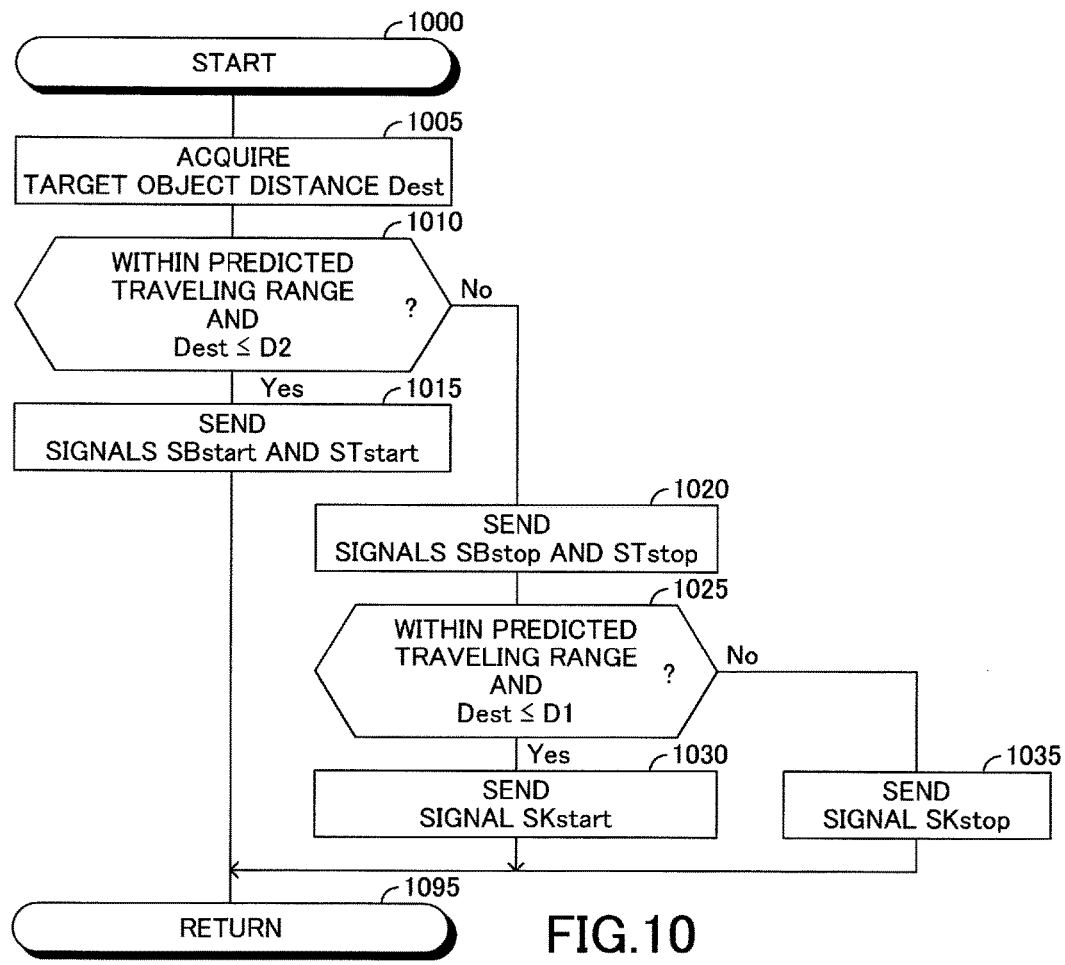
FIG. 10 is a flowchart for showing a routine executed by the CPU.

Further, the CPU is configured or programmed to execute a routine shown by a flowchart in FIG. 10 each time a predetermined time elapses. Therefore, at a predetermined timing, the CPU starts a process from a step 1000 and then, proceeds with the process to a step 1005 to acquire the updated target object distance Dest stored in the RAM of the driving assist ECU 20.

Next, the CPU proceeds with the process to a step 1010 to determine whether or not the target object 70 is within the predicted traveling range of the vehicle 10 and the target object distance Dest is equal to or smaller than the second threshold distance D2. When the target object 70 is within the predicted traveling range of the vehicle 10 and the target object distance Dest is equal to or smaller than the second threshold distance D2, the CPU determines "Yes" at the step 1010 and then, proceeds with the process to a step 1015 to send the automatic braking control start command signal SBstart to the brake ECU 40 and the torque limit control start command signal STstart to the engine ECU 30. Then, the CPU proceeds with the process to a step 1095 to terminate this routine once.

When the engine ECU 30 receives the torque limit control start command signal STstart and does not execute the torque limit control, the engine ECU 30 starts the torque limit control. When the engine ECU 30 receives the torque limit control start command signal STstart and executes the torque limit control, the engine ECU 30 ignores the torque limit control start command signal STstart.

When the brake ECU 40 receives the automatic braking control start command signal SBstart and does not execute the automatic braking control, the brake ECU 40 starts the automatic braking control. When the brake ECU 40 receives the automatic braking control start command signal SBstart and executes the automatic braking control, the brake ECU 40 ignores the automatic braking control start command signal SBstart.

When the target object 70 is outside of the predicted traveling range of the vehicle 10 or the target object distance Dest is larger than the second threshold distance D2, the CPU determines "No" at the step 1010 and then, proceeds with the process to a step 1020 to send the automatic braking control stop command signal SBstop to the brake ECU 40 and the torque limit control stop command signal STstop to the engine ECU 30.

When the brake ECU 40 receives the automatic braking control stop command signal SBstop and executes the automatic braking control, the brake ECU 40 stops the automatic braking control. When the brake ECU 40 receives the automatic braking control stop command signal SBstop and does not execute the automatic braking control, the brake ECU 40 ignores the automatic braking control stop command signal SBstop.

When the engine ECU 30 receives the torque limit control stop command signal STstop and executes the torque limit control, the engine ECU 30 stops the torque limit control. When the engine ECU 30 receives the torque limit control stop command signal STstop and does not execute the torque limit control, the engine ECU 30 ignores the torque limit control stop command signal STstop.

After the CPU executes the process of the step 1020, the CPU proceeds with the process to a step 1025 to determine whether or not the target object 70 is within the predicted traveling range of the vehicle 10 and the target object distance Dest is equal to or smaller than the first threshold distance D1 larger than the second threshold distance D2.

When the target object 70 is within the predicted traveling range of the vehicle 10 and the target object distance Dest is equal to or smaller than the first threshold distance D1 larger than the second threshold distance D2, the CPU determines "Yes" at the step 1025 and then, proceeds with the process to a step 1030 to send the alerting control start command signal SKstart to the alert ECU 50. Then, the CPU proceeds with the process to the step 1095 to terminate this routine once.

When the alert ECU 50 receives the alerting control start command signal SKstart and does not execute the alerting control, the alert ECU 50 starts the alerting control. When the alert ECU 50 receives the alerting control start command signal SKstart and executes the alerting control, the alert ECU 50 ignores the alerting control start command signal SKstart.

When the target object 70 is outside of the predicted traveling range of the vehicle 10 or the target object distance Dest is larger than the first threshold distance D1 upon an execution of the process of the step 1025, the CPU determines "No" at the step 1025 and then, proceeds with the process to a step 1035 to send the alerting control stop command signal SKstop to the alert ECU 50. Then, the CPU proceeds with the process to the step 1095 to terminate this routine once.

When the alert ECU 50 receives the alerting control stop command signal SKstop and executes the alerting control, the alert ECU 50 stops the alerting control. When the alert ECU 50 receives the alerting control stop command signal SKstop and does not execute the alerting control, the alert ECU 50 ignores the alerting control stop command signal SKstop.

The concrete operation of the embodiment apparatus has been described. According to the operation of the embodiment apparatus, when the vehicle 10 is traveling, the base table MapDest(X,Y) is corrected on the basis of the camera height Hc (i.e., the first camera height Hc1), the camera optical axis angle θc and the road surface gradient difference dθ which change the vertical position Y of the target object 70 in the camera image 65 (refer to the processes of the steps 840 and 845). Thus, the target object distance Dest corresponding to the actual target object distance Dact can be acquired.

In addition, when the vehicle 10 stops, the base table MapDest(X,Y) is corrected on the basis of the camera height Hc (i.e., the second camera height Hc2) in the situation that the vehicle movable load W is the maximum load capacity Wmax (refer to the processes of the steps 847 and 850). Thus, the target object distance Dest which is larger than the actual target object distance Dact is unlikely to be acquired.

It should be noted that the present invention is not limited to the aforementioned embodiment and various modifications can be employed within the scope of the present invention.

For example, the embodiment apparatus corrects the base table MapDest(X,Y). In this regard, the embodiment apparatus may be configured to correct the target object distance Dest acquired from the non-corrected base table MapDest (X,Y).

Further, when the embodiment apparatus previously stores distance conversion table MapDest(X,Y) each depending on the camera height Hc, the camera optical axis angle θc and the road surface gradient difference dθ in the ROM, the embodiment apparatus may be configured to correct or change a manner of determining which distance conversion table MapDest(X,Y) the embodiment apparatus uses, depending on the camera height Hc, the camera optical axis angle θc and the road surface gradient difference dθ.

Further, when the embodiment apparatus previously stores a calculation expression for calculating the target object distance Dest from the horizontal and vertical positions X and Y of the target object 70 in the camera image 65 in the ROM, the embodiment apparatus may be configured to correct the calculation expression.

Further, the driving assist ECU 20 may be configured to perform any of the alerting display by the display 52 and the generation of the alerting sounds by the buzzer 53 when the driving assist ECU 20 executes the alerting control.

Further, other than the alerting control, the automatic braking control and the torque limit control described above, one of the collision prevention controls is a control for automatically operating a steering column of the vehicle 10 to travel the vehicle 10 such that the vehicle 10 passes over the target object 70.

In addition, the vehicle height sensor may be a sensor for detecting an incline of the body of the vehicle (e.g., an acceleration sensor and a gravity sensor).

What is claimed is:

1. A vehicle driving assist apparatus applied to a vehicle which comprises a camera device including a camera for taking an image of a landscape in front of the vehicle in a traveling direction of the vehicle,
   the vehicle driving assist apparatus comprising at least one electric control unit configured:
   to acquire a target object distance which corresponds to a distance from the vehicle to a predetermined target object when the predetermined target object is included in a camera image which corresponds to an image of the landscape taken by the camera; and
   to execute a collision prevention control for preventing the vehicle from colliding against the predetermined target object when the predetermined target object is within a predicted traveling range of the vehicle and the target object distance is equal to or smaller than a predetermined distance,
   wherein the at least one electric control unit is configured:
   to acquire the camera image in chronological order when the vehicle is traveling, acquire a temporal change pattern of a position of a particular point in the camera image on the basis of the camera images acquired in chronological order and acquire a first camera height which corresponds to a height of the camera on the basis of the temporal change pattern;
   to acquire a target object position which corresponds to a position of the predetermined target object in the camera image when the vehicle is traveling and the predetermined target object is included in the camera image and acquire the target object distance on the basis of the target object position and the first camera height;
   to acquire a second camera height which corresponds to the height of the camera in a situation that a movable load of the vehicle is a maximum load capacity when the vehicle stops; and
   to acquire the target object position when the vehicle stops and the predetermined target object is included in the camera image and acquire the target object distance on the basis of the target object position and the second camera height.

2. The vehicle driving assist apparatus according to claim 1, wherein the at least one electric control unit is configured:
   to acquire at least one of a camera optical axis angle which corresponds to an angle defined between an optical axis of the camera and a horizontal plane on the basis of the temporal change pattern of the position of the particular point in the camera image; and
   to acquire the target object distance on the basis of the target object position, the first camera height and the camera optical axis angle when the vehicle is traveling and the predetermined target object is included in the camera image.

3. The vehicle driving assist apparatus according to claim 2, wherein the at least one electric control unit is configured:
   to acquire a road surface gradient difference which corresponds to a difference between a gradient of a road surface, on which the vehicle exists, and a gradient of a road surface in front of the vehicle in a traveling direction of the vehicle on the basis of the temporal change pattern of the position of the particular point in the camera image; and
   to acquire the target object distance on the basis of the target object position, the first camera height and the road surface gradient difference when the vehicle is traveling and the predetermined target object is included in the camera image.

4. The vehicle driving assist apparatus according to claim 3, wherein the at least one electric control unit is configured:
   to acquire the target object distance which is small when the road surface gradient difference is positive and large, compared with when the road surface gradient difference is positive and small; and
   to acquire the target object distance which is large when the road surface gradient difference is negative and an absolute value of the road surface gradient difference is large, compared with when the road surface gradient difference is negative and the absolute value of the road surface gradient difference small.

5. The vehicle driving assist apparatus according to claim 2, wherein the at least one electric control unit is configured:
   to acquire the target object distance which is small when the optical axis of the camera directs downward with respect to the horizontal surface and the camera optical axis angle is large, compared with when the optical axis of the camera directs downward with respect to the horizontal surface and the camera optical axis angle is small; and
   to acquire the target object distance which is large when the optical axis of the camera directs upward with respect to the horizontal surface and the camera optical axis angle is large, compared with when the optical axis of the camera directs upward with respect to the horizontal surface and the camera optical axis angle is small.

6. The vehicle driving assist apparatus according to claim 1, wherein the at least one electric control unit is configured:
   to acquire a road surface gradient difference which corresponds to a difference between a gradient of a road surface, on which the vehicle exists, and a gradient of a road surface in front of the vehicle in a traveling direction of the vehicle on the basis of the temporal change pattern of the position of the particular point in the camera image; and
   to acquire the target object distance on the basis of the target object position, the first camera height and the road surface gradient difference when the vehicle is traveling and the predetermined target object is included in the camera image.

7. The vehicle driving assist apparatus according to claim 6, wherein the at least one electric control unit is configured:

to acquire the target object distance which is small when the road surface gradient difference is positive and large, compared with when the road surface gradient difference is positive and small; and to acquire the target object distance which is large when the road surface gradient difference is negative and an absolute value of the road surface gradient difference is large, compared with when the road surface gradient difference is negative and the absolute value of the road surface gradient difference small.

8. The vehicle driving assist apparatus according to claim 1, wherein that the at least one electric control unit is configured to acquire the target object distance which is small when the first camera height is small, compared with when the first camera height is large.

9. The vehicle driving assist apparatus according to claim 1, wherein the at least one electric control unit is configured to acquire the target object distance which is small when the second camera height is small, compared with when the second camera height is large.

* * * * *